UNITED STATES PATENT OFFICE.

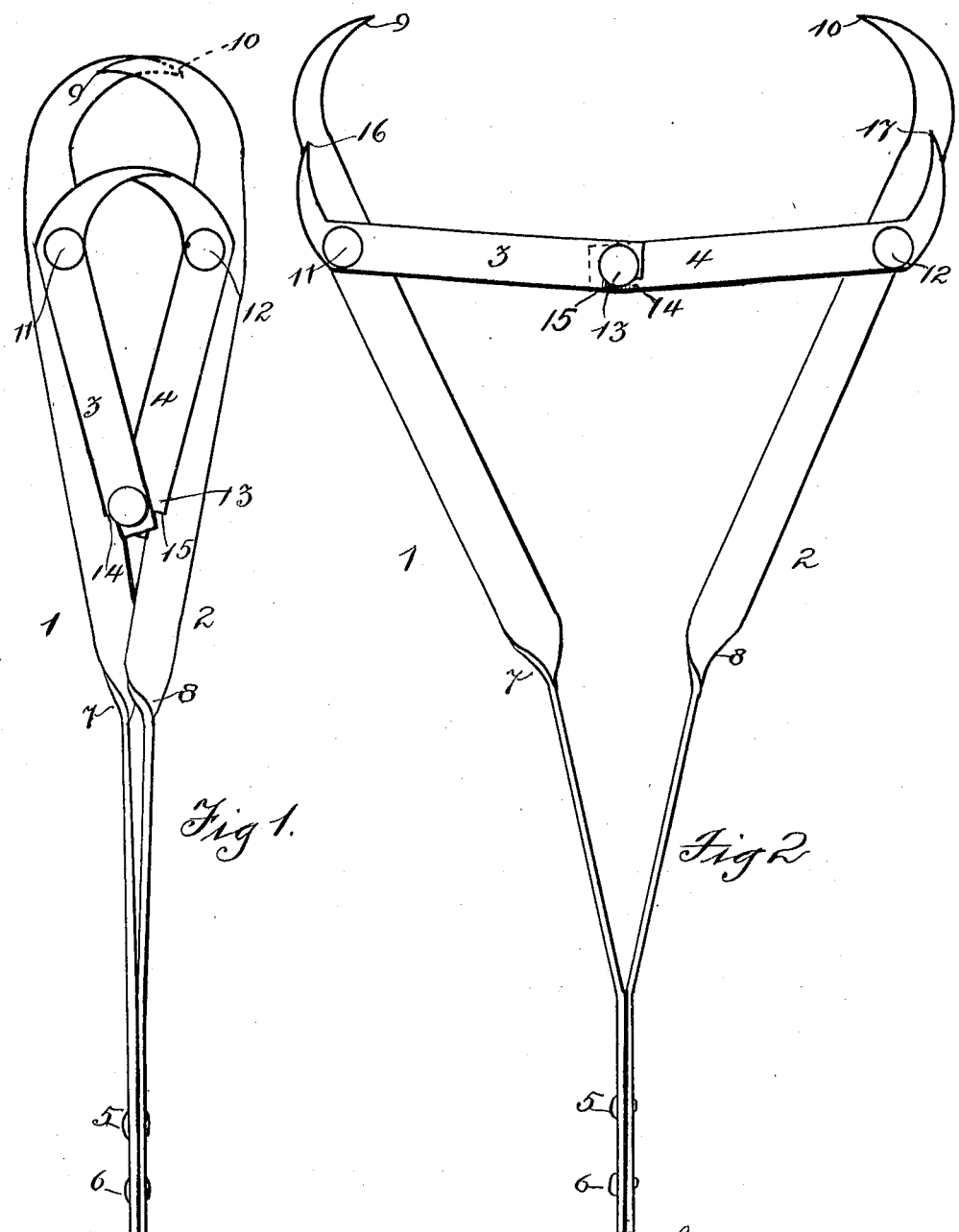

FREDERICK KLINGER, OF SAN FRANCISCO, CALIFORNIA.

FISH-GRAPPLE.

1,004,577.　　　　　Specification of Letters Patent.　　　Patented Oct. 3, 1911.

Application filed October 6, 1909. Serial No. 521,250.

*To all whom it may concern:*

Be it known that I, FREDERICK KLINGER, a citizen of the United States, and resident of the city and county of San Francisco, State of California, have invented certain new and useful Improvements in Fish-Grapples, of which the following is a specification.

My invention relates to fish grapples and has for its object to provide means for grappling fish, said means being of an improved construction, which can be economically manufactured and efficiently operated.

I accomplish my object by the means illustrated in the accompanying drawing, of which—

Figure 1, is a view in elevation of my device in its closed position. Fig. 2, a view in elevation of my device in its open, or operative, position.

The same numeral of reference marks the same part in both views.

In general terms my invention consists of two outer spring plates riveted together at one extremity and sharpened to points at the other extremities, in combination with a pair of inner pivoted trap plates arranged to maintain the spring plates unstably in an open position, and having also extremities sharpened to points.

Referring to the drawing, 1, and 2, are the spring plates 3, and 4, are the trap plates. The spring plates are riveted at 5, and 6, with their flat surfaces lying against each other, and facing each other between the riveted extremities and the positions marked 7, and 8. At 7, and 8, they are twisted so as to present their edges to each other, one overlapping the other when in the closed position as in Fig. 1. The other extremities of the plates terminate in the points 9, and 10, which overlap in Fig. 1, when in the closed position. In combination with the said spring plates and pivoted thereto at 11, and 12, are the trap plates 3, and 4, the said plates being pivoted together at 13. The adjoining ends of the trap plates 3, and 4, may be cut after the manner shown at 14, and 15, and slightly bent out of the plane of the plates to mutually engage when the grapple is open. By arranging the ends of 3, and 4 in the described manner the points 11, 12, and 13, need not lie in the same straight line in order to maintain the springs 1, and 2 in an open position.

In operating my device springs 1, and 2, are pulled apart and the pivots 13, of plates 3, and 4, is moved into a position closely in line with the pivots 11, and 12. In this position the springs 1, and 2, are held apart and the points 9, and 10 of the spring plates 1, and 2, and the points 16, and 17, of the trap plates 3, and 4, are separated from one another. The fish is struck by the trap plates 3, and 4, at or near their junction point, with sufficient force to throw pivot 13, out of line with pivots 11, and 12; whereupon the springs 1, and 2, collapse driving points 9, and 10 together and points 16, and 17, together through the body of the fish. At the extremity 5, and 6, a suitable pole or line may be attached.

Having described my invention what I claim as new and desire to secure by Letters Patent of the United States is:

In a fish grapple, a pair of spring plates riveted together at one extremity, and sharpened to points at the other, a pair of trap plates pivoted together at one of their ends and ending in sharpened points at the other, a pivotal connection between each of said trap plates, and one of said spring plates, whereby the grapple may be set by setting the three pivots in the same straight line, and may be sprung by throwing the center pivot out of line with the other two.

In testimony whereof I have hereunto signed my name in the presence of two witnesses.

FREDERICK KLINGER.

Witnesses:
　FRANK P. MEDINA.
　W. T. HESS.

---

Copies of this patent may be obtained for five cents each, by addressing the "Commissioner of Patents, Washington, D. C."